Aug. 23, 1938.  R. A. GOEPFRICH  2,127,801
BRAKE
Filed Nov. 27, 1936
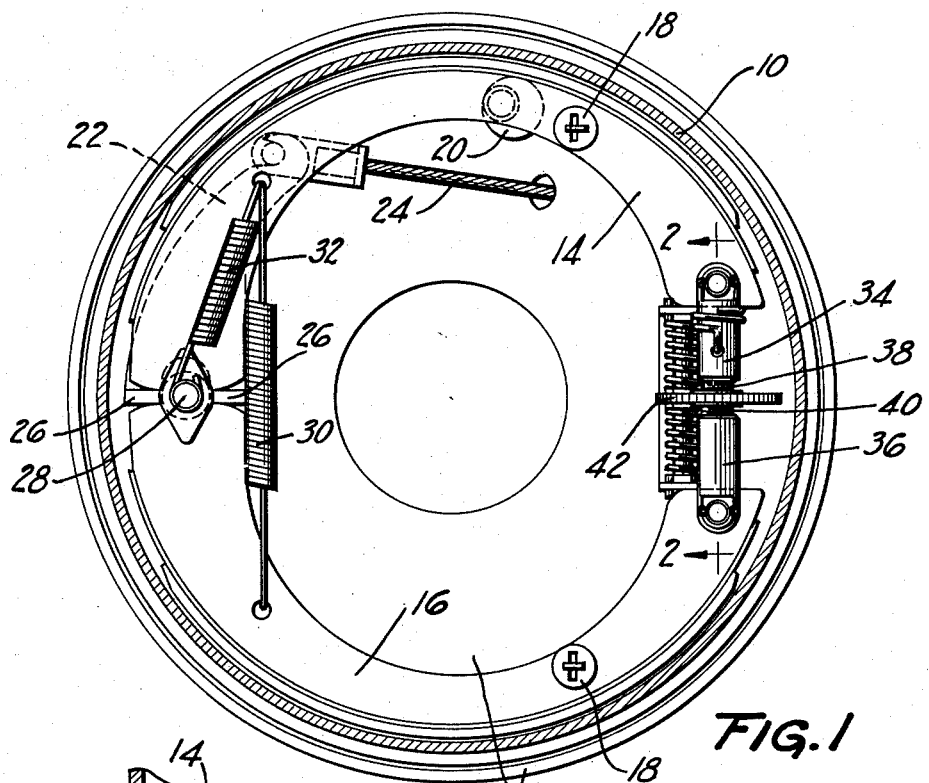
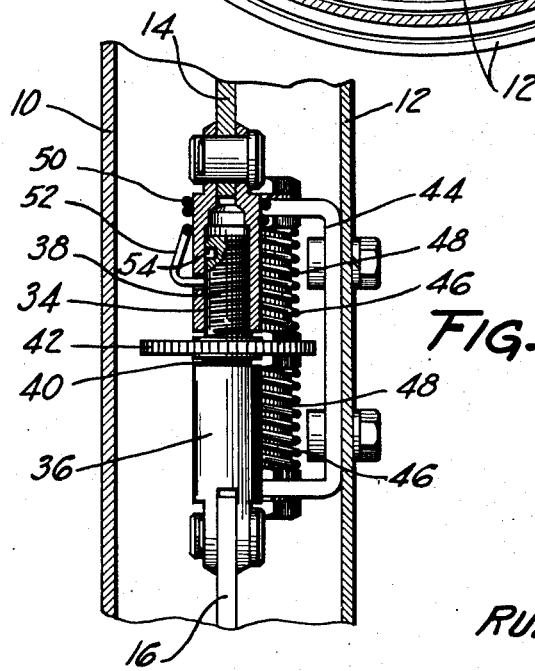
FIG.1
FIG.2
INVENTOR
RUDOLPH A. GOEPFRICH
BY
ATTORNEY Patented Aug. 23, 1938

2,127,801

UNITED STATES PATENT OFFICE 2,127,801

BRAKE

Rudolph A. Goepfrich, South Bend, Ind., assignor to Bendix Products Corporation, South Bend, Ind., a corporation of Indiana Application November 27, 1936, Serial No. 112,849

3 Claims. (Cl. 188—79.5)

This invention relates to brakes, and is illustrated as embodied in an internal expanding brake for an automobile.

An object of the invention is to improve the wear adjustment of the brake to prevent further adjustment after some predetermined point is reached, as for example to prevent further adjustment after the lining is entirely worn out, so that it is not possible to adjust so far that metal parts of the shoes might engage and score the brake drum. Preferably special means, such as a spring lock or pawl, is arranged to become effective when the linings are so badly worn as to require replacement.

The illustrated wear adjustment includes a device adjustably connecting two shoes, so that the effective length of the friction means can be changed to compensate for wear. In the arrangement shown in the drawing, a spring centering device also acts on the wear adjustment, as for example by engaging a central flange having oppositely-directed stems adjustably received in sockets at the ends of the shoes. In this case the locking means may be a spring-actuated pawl projecting through an opening in the side wall of the socket and, at the proper time, projected yieldingly into a depression in the stem.

The above and other objects and features of the invention, including novel combinations of parts and desirable particular constructions, will be apparent from the following description of the illustrative embodiment shown in the accompanying drawing, in which:

Figure 1 is a vertical section through the brake, just inside the head of the brake drum, and showing the brake shoes in side elevation; and Figure 2 is a partial section through the brake, on the line 2—2 of Figure 1.

The brake illustrated in the drawing includes a rotatable drum 10, at the open side of which is a support such as a backing plate 12, and within which is arranged the brake friction means, in this case comprising a pair of shoes 14 and 16. The shoes are provided with suitable spring steady rests 18 and an adjustable stop 20.

The brake is provided with suitable applying means, such as a lever 22 arranged between the shoe 14 and the backing plate 12 and actuated by a cable or the like 24 extending through the backing plate and forming part of a Bowden-type control.

The lever 22 is shown with actuating lugs 26 projecting between the shoes on opposite sides of an anchor 28 carried by the backing plate and against which one or the other of the shoes rests when the brake is applied. The shoes are applied against the resistance of a return spring 30, and an unbalancing spring 32 tensioned between the anchor 28 and secondary shoe 14 holds the latter shoe yieldingly against the anchor, except when in reverse braking it is overcome by the frictional action of the drum.

Opposite the above-described anchorage and applying means, the shoes are shown connected by a novel adjusting and centering device, to which the present invention more particularly relates. In the form illustrated, this device includes sockets 34 and 36 pivoted to or otherwise mounted on or engaging the shoe ends, and which are internally threaded or otherwise formed adjustably to receive the oppositely directed threaded stems 38 and 40 of an adjuster having an operating flange 42 between the sockets.

The flange 42 is accessible through an opening (not shown) in the backing plate. The flange 42 may, if desired, be engaged by a spring centering device shown as carried by a U-shaped bracket 44 mounted on the backing plate and provided with springs 46 yieldingly urging plungers 48 against opposite sides of the flange 42.

The means shown for limiting the adjustment of the device 38—42, or its equivalent, is a spring lock such as a torsion coil spring 50 sleeved about the socket 34 and having one end bearing against the end of the shoe 14, or some other adjacent part, to hold the spring under tension. The other end of the spring is formed as a pawl 52 projecting through an opening in the wall of the socket 34. The stem 38 is provided with a depression 54 into which the pawl 52 snaps at a predetermined position of adjustment, i. e., when the lining is so badly worn that further adjustment might cause the steel rims of the shoes to engage and score the drum.

While one illustrative embodiment has been described in detail, it is not my intention to limit the scope of the invention to that particular embodiment, or otherwise than by the terms of the appended claims.

I claim:

1. A brake adjustment comprising two parts adjustably threaded together, and a spring member mounted on the exterior of the outer part and extending through the outer part into engagement with the inner part and which is effective at one position of adjustment of said parts to lock them together to prevent relative turning thereof.

2. A brake comprising shoes having sockets at their ends, an adjustable member having a central flange between said sockets and oppositely extending stems adjustably received in said sockets, centering means acting on said flange, and means for locking one socket and the corresponding stem together in one position of adjustment, said means comprising a spring coiled about the socket and having its end formed as a spring pawl, the wall of the socket having an opening through which the pawl projects and the stem having a depression in which said pawl seats in said position of adjustment.

3. A brake comprising shoes having sockets at their ends, an adjustable member having a central flange between said sockets and oppositely extending stems adjustably received in said sockets, and means for locking one socket and the corresponding stem together in one position of adjustment, said means comprising a spring coiled about the socket and having its end formed as a spring pawl, the wall of the socket having an opening through which the pawl projects and the stem having a depression in which said pawl seats in said position of adjustment.

RUDOLPH A. GOEPFRICH.